United States Patent Office 2,711,253
Patented June 21, 1955

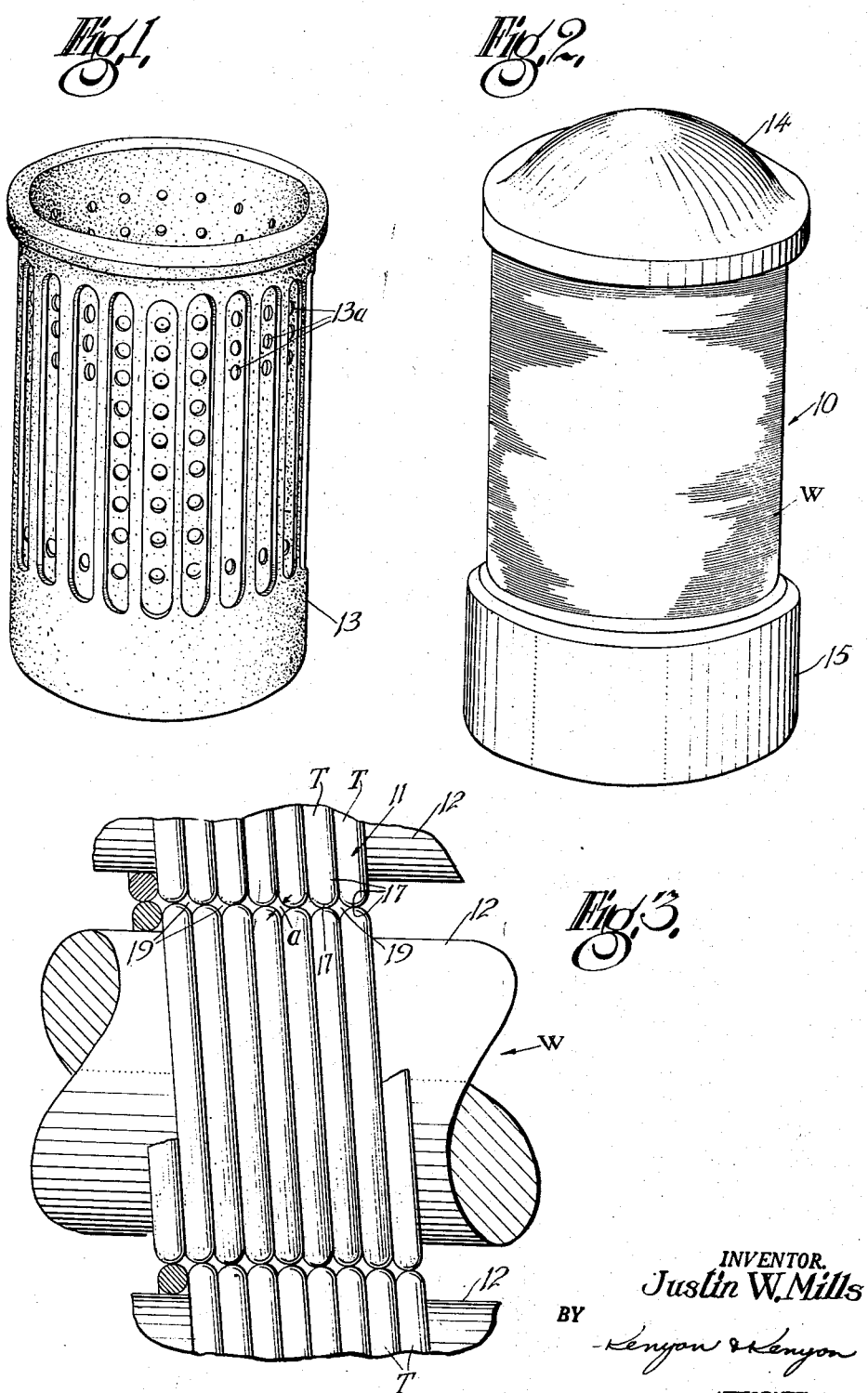

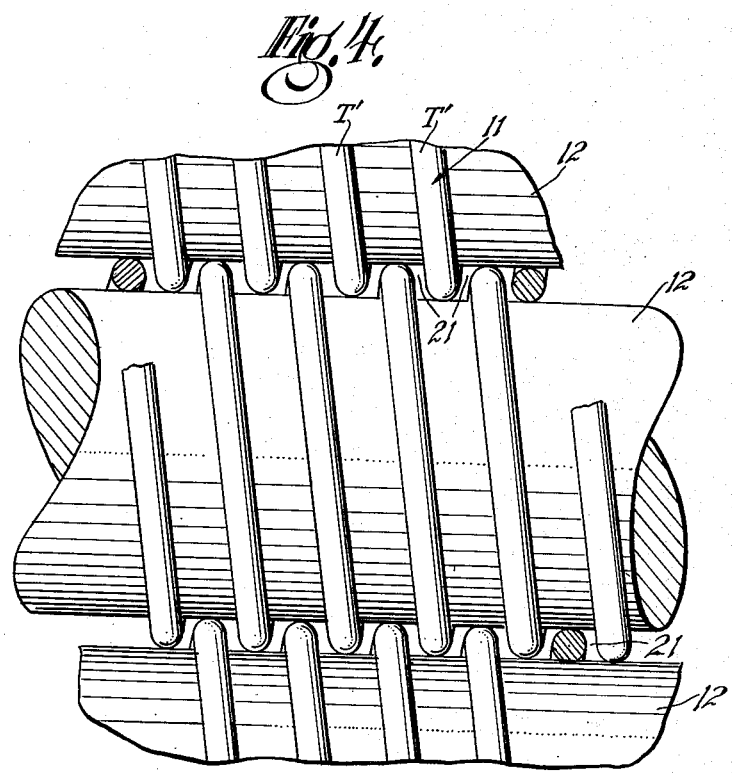
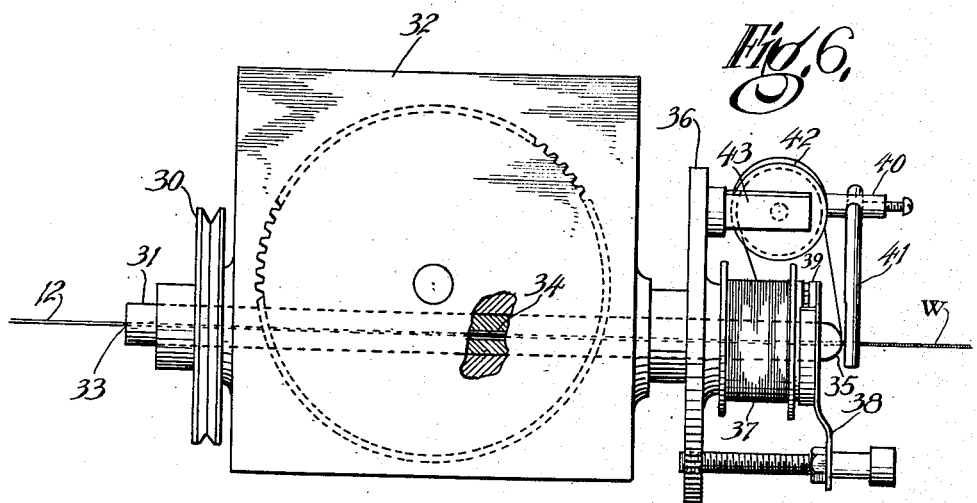

2,711,253

WRAPPED WIRE EDGE TYPE FILTER ELEMENT

Justin W. Mills, Orange, N. J., assignor to Purolator Products, Inc., Rahway, N. J., a corporation of Delaware Application November 13, 1952, Serial No. 320,327

5 Claims. (Cl. 210—169)

This invention relates to an edge-type fluid filter element. It is a primary object of the invention to provide a metal edge-type filter element capable of removing exceedingly small particles of dirt, water, or other foreign matter from fluids.

It is a further object of the invention to provide a method of manufacturing such an element.

The increased use of filters, especially for filtration of fluids has brought about increasing demands for removal of ever smaller particles. At the present time there are several types of filters on the market which have been fairly successful in removing particles as small as 5 microns (1 micron=$10^{-6}$ meters) but none has been completely satisfactory. For use in filtering such liquids as oil and jet aviation fuel, the following conditions should be satisfied by a truly successful filter. It must have:

1. Ability to remove particles as small as 5 microns with 100% effectiveness.
2. Ability to withstand high temperatures.
3. Cleanability of the element.
4. High strength in order to withstand high differential pressures.

Of the present elements in wide use, the impregnated paper, convoluted type of element is not resistant to extra high temperatures; and while it is capable of removing up to 95% of 5-micron particles, it is not satisfactory in certain applications which require 100% removal. Diatomaceous earth types of filters are not recleanable. Screen types will not remove particles below 40 microns.

This invention contemplates improvements over these known types of filters and, to meet the desired conditions, the use of a metal edge-type filter of a new kind. An existing metal edge-type of filter is shown in the patent to Liddell No. 2,042,537, June 2, 1936. This Liddell filter is made of a continuous flat ribbon, with the turns helically coiled about a support or frame to form a cylinder. The wire has irregularities or projections on the surface to provide filtering apertures or interstices. While such a Liddell filter has proved successful for most uses, it is incapable of removing 5-micron particles. The invention of the present improvement, while retaining the basic helical winding principle of the Liddell patent, comprises the use of a wrapped wire instead of the flat ribbon. This is accomplished by helically wrapping a very small diametered wire around a larger diametered wire, and then helically winding the resulting wrapped wire around a suitable support or frame, as is hereinafter explained in detail and as shown in the accompanying drawing wherein:

Fig. 1 is a perspective view of a suitable frame about which the wrapped wire is wound;

Fig. 2 is a perspective view of a typical filter element made in accordance with this invention;

Fig. 4 is a view similar to Fig. 3, except with a different arrangement of wrapping of the smaller diametered wire on the larger diametered wire;

Fig. 5 is a perspective view of mechanism that may be used to make the element; and Fig. 6 is a fragmentary elevation of a portion of the mechanism of Fig. 5 illustrating structural details.

Figure 3:
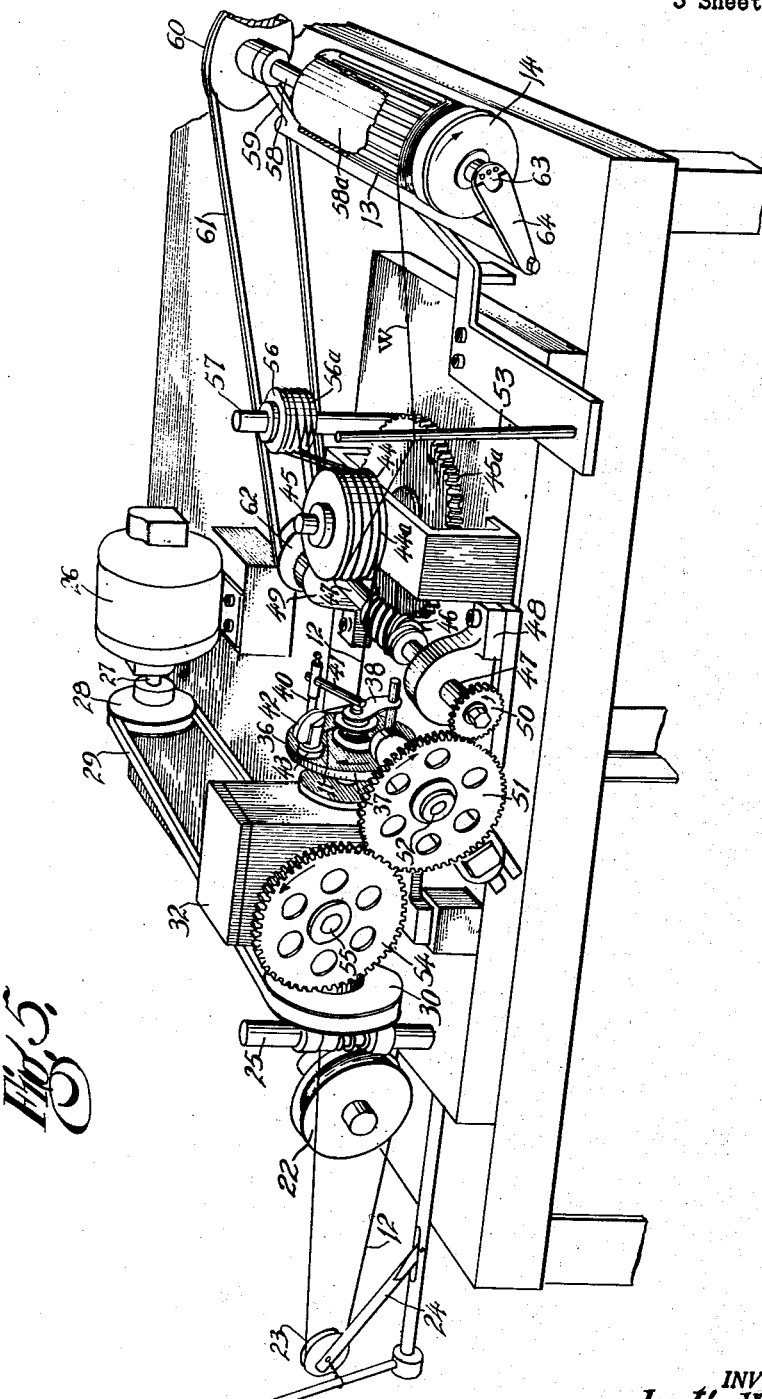
Fig. 3 is a greatly enlarged fragmentary side view of a portion of the wrapped element shown in Fig. 2.

Referring to the drawing, the filter element 10 is made by helically wrapping a thin wire 11 approximately .0005 inch in diameter about a thicker wire 12 which is approximately .005 inch in diameter, and then winding the resulting wrapped wire W helically around a tubular support or frame 13 (Fig. 1) which has flow openings 13a in its surface. The term "wrapped wire" whenever used herein is intended to mean a combination of two wires of different diameters, around the larger diametered one of the two the smaller diametered wire has been helically wound or wrapped. The smaller diametered or thinner wire 11 can be made of titanium, tungsten, or tungsten plated with platinum, rhodium or gold. If tungsten is used, it will have a tensile strength of about 125,000 p. s. i. and will weigh about 1.31 mg. per 100 meters. The larger diametered or thicker wire 12 can be made of corrosion-resistant metal, titanium, stainless steel, or be of platinum plated on any of these three. In addition to the helical winding of the wrapped wire W on the outer surface of the support or frame 13, the filter element 10, as shown in Fig. 2, is completed by the inclusion of a top cap 14 and a bottom collar 15 which are fitted to and secured at opposite ends of the support or frame 13. The cap 14 closes off the top of the element 10, but the bottom of each element is open to permit liquid flow into and out of element 10, and is fitted with an O ring or other conventional means (not shown) for sealing it to a flow conduit of a conventional filter casing (not shown).

Fig. 3 illustrates the character of wrapping of the thinner wire 11 about tthe thicker wire 12 necessary to produce the smallest filtering opening. The thinner or smaller wire 11 is wrapped spirally and tightly about the thicker or larger diametered wire 12 with adjacent turns T of the thinner wire 11 in contact with each other. The resulting wrapped wire is then wound around the frame 13 helically with high points of individual turns T of the thinner wire 11 on adjacent turns of the wrapped wire in tangent contact. The areas 19 formed by tangent points 17 of the turns T of the thinner wire 11 are the actual filtering interstices, and it can be seen that the shortest interstice distance "a" between contact points 17 of the thin wire turns T will govern the size of the dirt particles that can be filtered out by the element 10, since the particles are assumed to be spherical in shape. The tight wrapping of thinner wire 11 of the dimensions specified above about the thicker wire 12 gives 1894 turns per inch of wire 11 on wire 12. By a simple calculation, then, for a thin wrapping wire 11 of .0005 inch diameter wrapped around a thicker wire 12 of .005 inch diameter, it can be shown that the distance "a" will be equal to .0002 inch which is 5 microns (.001 inch equals 25.4 microns. It can be readily seen that reducing the diameter of the thinner wire 11 will result in still smaller distances "a" and a still finer filtration, while enlarging the diameter of wire 11 will have the opposite effect.

In some cases filtration down to 5 microns is not required, and rather than increase the diameter of the thinner wire 11, it is simply wrapped around wire 12 with greater spacing between turns. For example, wrapping the wire 11 tightly about thicker wire 12, as described above, will give 1894 turns per inch around the thicker wire 12 and give 5-micron filtration. On the other hand, decreasing the number of wrapping turns of thinner wire 11 about wire 12 to 530 turns per inch will only give filtration down to 60 microns. In fact, any desired micron size can be obtained by varying the number of turns per inch of wire 11 on wire 12 as desired.

Fig. 4 illustrates a typical wrapping used to obtain filtration of larger than 5-micron particles. In this case, the thinner wire 11 while still wrapped or wound tightly around the larger diametered wire 12, has its turns T' spaced farther apart to provide larger filtration areas 21. The turns T' of the wire 11 on adjacent turns of the larger diametered wire 12 also are intermeshed if the spacing between turns T' is large enough. It can be readily seen that the further the turns or wrappings T' of the wire 11 are spaced apart, the larger the particles that pass through; hence, the coarser the filtration.

Fig. 5 illustrates a typical apparatus which can be used for wrapping the smaller diametered wire 11 around the larger diametered wire 12, and for winding the wrapped wire around the frame 13 to make the element 10. Larger diametered wire 12 is carried on the supply reel 22 and is pulled off over tension pulley 23 which is mounted on tension arm 24; it then passes through tension rod 25. A motor 26 through its shaft 27, pulley 28 and belt 29, rotates pulley 30 and shaft 31 (Fig. 6) of a reduction gear box 32. The wire 12 enters the back end of the shaft 31 at a point 33 and passes through a hollow passage 34 of the shaft, emerging at the rounded front end 35 of shaft 31.

Mounted on and rotating with the shaft 31 is a face plate 36 (Figs. 5 and 6). A spool 37 is also carried by the shaft 31, and is free-rotating thereon. This spool 37 carries the smaller diametered wire 11. Mounted on face plate 36 is a tension arm 38, carrying a bearing 39 that acts to hold the rotatable spool 37 concentrically on the shaft 31. Also mounted on the face plate 36 is the holder 40 which carries a guide arm 41. The face plate 36 also carries tension pulley 42 on an arm 43. Pulley 42 is cocked at an angle as shown. As the shaft 31 and face plate 36 rotate in unison, small diametered wire 11 is pulled off spool 37, passes around pulley 42, and is wrapped around the forwardly moving larger diametered large wire 12 by the orbital rotation of the pulley 42 around thicker wire 12 as the latter emerges from the rounded end 35 of shaft 31, and wire 11 is guided in its wrapping action by the arm 41.

The thicker wire 12 on which wire 11 is wrapped is given its forward movement or pull by means of the takeup drum 44, which has a series of grooves 44a. This drum 44 is fixedly mounted on a vertically supported driven shaft 45 and also carries a worm follower gear 45a. This gear 45a is driven by worm gear 46 which is fixedly mounted on a horizontal shaft 47 that rotates in bearings 48 and 49. Shaft 47 carries at one end a gear 50 which is driven by an idler gear 51 mounted on a shaft 52. Idler gear 51 in turn is driven by gear 54 mounted on output shaft 55 of the reduction gear box 32.

The wrapped wire W passes from one groove 44a of drum 44 to a corresponding groove 56a of a drum 56, which is rotatively mounted on a vertically supported shaft 57. Drum 56 is similar to drum 44. The wrapped wire W passes back and forth two or three times between the grooves 44a and 56a on the drums 44 and 56 to give the required tension, and then is directed from drum 44 by a vertical guide rod 53 to the support 13 on which it is to be helically wound. The support 13 is mounted on a driven rotating shaft 58 which has a receiving head 58a to carry the support 13. This shaft 58 is carried by bearing support 59. A pulley 60 is fixed to one end of shaft 58. This pulley 60 is driven by belt 61 from pulley 62 which is mounted on the driven worm-carrying shaft 47. The support 13 is carried loosely on the head 58a of the shaft 58 in order to give a very low order of winding tension to the support 13. The main winding tension that is supplied to the support 13 comes from a bearing 63 carried by a support 64, said bearing 63 pressing against top cap 14 which is fastened to the support 13. Then as the shaft 58 rotates, its friction combines with pressure of bearing 63 to give just enough tension to the support 13 to helically wind the wrapped wire W to the support 13 and furnish a complete filter element 10.

If a greater pitch is required for the thinner wire 11 in its wrapping about wire 12 to provide the spacing of the turns T' of wire 11 on wire 12 as shown in Fig. 4, for example, such a change in pitch is made by altering the gearing ratios between the drive gear 54, idler 51, and driven gear 50 to a desired different speed of shaft 47. This will alter the linear speed of travel of the larger diametered wire 12 as it is pulled through shaft 31, while the speed of wrapping of the smaller diametered wire 11 around wire 12 will not be changed since the speed of face plate 36 remains unchanged.

In summary, it can be seen that the invention comprises an edge-type filter consisting of a wrapped wire helically wound around a support, to give a very fine degree of filtration, and of the method of making such an edge-type filter.

The term "helix" as used heretofore and in the following claims refers not only to elements which are cylindrical as shown in the drawings, but to other shapes such as truncated cones and the like.

Variations in detail and procedural steps within the scope of the invention as defined in appended claims are possible and are contemplated. There is no intention of limitation to the exact details shown and described.

What is claimed is:

1. In an edge-type filter element, a wire, a smaller diametered wire helically and regularly wound continuously about said first wire with closely spaced turns to provide a wrapped wire consisting of said first named wire and said smaller-diametered wire, and a support, said wrapped wire being wound around said support to form a helix whose turns are closely adjacent each other so that outer surfaces of the turns of thin wires in adjacent turns of the wrapped wire make tangent contacts with each other to define uniformly-dimensioned filtering interstices between all the tangent contacts.

2. In an edge-type filter element, a wire, a smaller diametered round thin wire helically and tightly wound continuously in regularly and closed spaced turns about said first wire to provide a wrapped wire consisting of said first named wire and said smaller diametered wire, and a support, said wrapped wire being wound around said support to form a helix with round outer surfaces of the turns of the thin wire of adjacent turns in the wrapped wire making tangent contacts with each other and thereby defining uniformly dimensioned filtering interstices.

3. A method for making an edge-type filter element comprising the steps of continuously winding helically and tightly a smaller diametered round wire with closely adjacent turns around a larger diametered wire and winding the resulting wrapped wire consisting of said larger diametered wire bearing the helically wound smaller diametered round wire in the form of a helix whose turns are closely adjacent each other and so that the turns of smaller diametered round wire on adjacent turns of the helix are in tangent contact with each other and thereby define uniformly dimensioned filtering interstices.

4. The method of claim 3 in which the winding of the said wrapped wire is done around a support.

5. In a method for forming a filter element comprising a continuous wrapped wire in the form of a helix which has filtering interstices between adjacent turns of the helix, and which is carried by a support, the steps comprising helically winding a smaller diametered round wire tightly and regularly around a larger diametered wire with closely spaced turns to form a wrapped wire consisting of said larger diametered wire bearing thereon the helically wound smaller diametered round wire, feeding said wrapped wire to a support, and rotating said support to cause said wrapped wire to form a helix about said support whose turns are closely adjacent each other and so that the turns of smaller diametered round wire on adjacent turns of the helix are in tangent contact and thereby define uniformly dimensioned filtering interstices between adjacent turns of the helix of wrapped wire.

References Cited in the file of this patent

UNITED STATES PATENTS

| | | |
|---|---|---|
| 1,414,132 | Hurrell | Apr. 25, 1922 |
| 1,774,232 | Hartwell | Aug. 26, 1930 |
| 2,042,537 | Liddell | June 2, 1936 |
| 2,247,460 | Wright | July 1, 1941 |

FOREIGN PATENTS

| | | |
|---|---|---|
| 541,948 | France | May 10, 1922 |
| 116,805 | Switzerland | Oct. 6, 1924 |